US 11,305,655 B2

(12) United States Patent
Lee et al.

(10) Patent No.: US 11,305,655 B2
(45) Date of Patent: Apr. 19, 2022

(54) ELECTRIC POWER CONVERSION SYSTEM FOR VEHICLE AND CONTROL METHOD THEREOF (71) Applicants: HYUNDAI MOTOR COMPANY, Seoul (KR); KIA MOTORS CORPORATION, Seoul (KR)

(72) Inventors: Dae Woo Lee, Incheon (KR); Min Seong Choi, Daejeon (KR); Si Hun Yang, Hwaseong-si (KR); Jae Eun Cha, Gwangmyeong-si (KR); Jin Young Yang, Hanam-si (KR); In Yong Yeo, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 111 days.

(21) Appl. No.: 16/815,306

(22) Filed: Mar. 11, 2020

(65) Prior Publication Data
US 2021/0039506 A1 Feb. 11, 2021

(30) Foreign Application Priority Data

Aug. 6, 2019 (KR) .......................... 10-2019-0095383

(51) Int. Cl.
B60L 11/18 (2006.01)
H02M 3/158 (2006.01)
(Continued)

(52) U.S. Cl.
CPC ............... B60L 50/14 (2019.02); B60L 50/61 (2019.02); B60L 53/24 (2019.02); H02M 3/1582 (2013.01); B60L 2210/30 (2013.01)

(58) Field of Classification Search
CPC ......... Y02T 10/62; Y02T 90/14; Y02T 10/72; Y02T 10/70; Y02T 10/7072; Y02T 10/92;
(Continued)

(56) References Cited

U.S. PATENT DOCUMENTS 9,809,121 B2 11/2017 King et al.
2011/0188271 A1* 8/2011 Shinotsuka ........... H02M 3/335
363/21.15
(Continued)

FOREIGN PATENT DOCUMENTS

KR 10-1229441 B1 9/2012
KR 10-1273736 B1 9/2012
KR 10-1489226 B1 2/2015

Primary Examiner — Jared Fureman
Assistant Examiner — Esayas G Yeshaw
(74) Attorney, Agent, or Firm — Lempia Summerfield Katz LLC (57) ABSTRACT An electric power conversion system includes: an AC-DC conversion circuit converting AC charging power into DC power; a motor including a plurality of coils, one end of each being connected to a neutral point; a first switching device selectively allowing or blocking supply of output power from the AC-DC conversion circuit to the neutral point; an inverter including a plurality of motor connection terminals connected to the other ends of the coils of the motor, respectively, DC connection terminals including a positive terminal and a negative terminal, and a plurality of switching elements forming electrical connections between the DC connection terminals and the plurality of motor connection terminals; a battery connected to the DC connection terminals of the inverter; and a controller controlling operations of the AC-DC conversion circuit, the first switching device, and the inverter in accordance with whether or not the battery is charged.

15 Claims, 3 Drawing Sheets (51) Int. Cl.
  *H02M 1/14*    (2006.01)
  *B60L 50/14*   (2019.01)
  *B60L 50/61*   (2019.01)
  *B60L 53/24*   (2019.01)

(58) Field of Classification Search
  CPC ........... H02M 3/33584; H02M 3/1582; H02M 5/297; H02M 3/1584; H02M 7/4807; B60L 2210/30; B60L 50/14; B60L 53/24; B60L 50/61
  See application file for complete search history.

(56) References Cited

U.S. PATENT DOCUMENTS

| | | | | |
|---|---|---|---|---|
| 2013/0002048 A1* | 1/2013 | Ichikawa | ................ | H02J 50/12 |
| | | | | 307/149 |
| 2016/0041290 A1* | 2/2016 | Hahl | ...................... | G01V 3/104 |
| | | | | 324/329 |
| 2016/0141996 A1* | 5/2016 | Kim | ....................... | B60L 50/15 |
| | | | | 318/497 |
| 2018/0115180 A1* | 4/2018 | Shin | ....................... | H02J 7/0068 |
| 2018/0334043 A1* | 11/2018 | Zou | ........................ | B60L 53/14 |
| 2019/0356252 A1* | 11/2019 | Kameyama | ............... | H02P 6/24 |

\* cited by examiner

ELECTRIC POWER CONVERSION SYSTEM FOR VEHICLE AND CONTROL METHOD THEREOF

CROSS REFERENCE TO RELATED APPLICATION

This application claims priority to and the benefit of Korean Patent Application No. 10-2019-0095383, filed Aug. 6, 2019, the entire contents of which are incorporated herein by reference.

FIELD

The present disclosure generally relates to an electric power conversion system for a vehicle and a control method thereof.

BACKGROUND

The statements in this section merely provide background information related to the present disclosure and may not constitute prior art.

In general, an electric vehicle or a plug-in hybrid vehicle can charge a battery therein with power provided from external charging equipment and can generate propulsion force thereof by actuating a motor using electric energy stored in the charged battery.

Such a vehicle is provided with an on-board charger (OBC) to convert alternating current (AC) charging power provided from an external source into direct current (DC) power having a suitable voltage level and to provide the DC power to a battery disposed within the vehicle in order to charge the battery. In addition, the vehicle may be provided with a low voltage DC-DC converter (LDC) to convert a high voltage, output from the battery to actuate the motor, into a low voltage to be used by electrical components of the vehicle.

As described above, vehicles are provided with a variety of power conversion devices used for a variety of purposes. However, we have discovered that some devices only operate in a specific operation mode of a vehicle while being inoperative in other operation modes. For example, an on-board charger disposed in a vehicle to convert AC power, provided from an external source, into DC power, with which a battery is charged, does not operate at all in a travel mode in which a vehicle travels.

Accordingly, we have found that when a power unit used for traveling of a vehicle and an on-board charger share some components or are integrated into a single structure, the number of components used for constructing an entire power conversion system can be reduced, thereby reducing the weight and size of the power conversion system.

The foregoing is intended merely to aid in the understanding of the background of the present disclosure, and is not intended to mean that the present disclosure falls within the purview of the related art that is already known to those skilled in the art.

SUMMARY

The present disclosure proposes an electric power conversion system and a control method thereof, in which an on-board charger and a low voltage DC converter converting a high voltage of a battery into a low voltage are integrated with each other, so that the number of components can be reduced and the weight and size of a power conversion apparatus can be reduced.

In one aspect of the present disclosure, an electric power conversion system for a vehicle may include: an AC-DC conversion circuit converting AC charging power into DC power; a motor including a plurality of coils each having a first end respectively connected to a neutral point; a first switching device selectively allowing or blocking supply of output power from the AC-DC conversion circuit to the neutral point; an inverter including: a plurality of motor connection terminals respectively connected to second ends of the plurality of coils of the motor, DC connection terminals including a positive terminal and a negative terminal, and a plurality of switching elements forming electrical connections between the DC connection terminals and the plurality of motor connection terminals; a battery connected to the DC connection terminals of the inverter; and a controller controlling operations of the AC-DC conversion circuit, the first switching device, and the inverter based on whether or not the battery is charged.

According to another form, the AC-DC conversion circuit may include: a first bridge circuit including a plurality of switching elements forming a bridge circuit and configured to receive AC charging power from an external AC charging equipment; a transformer including a first coil, to which an AC voltage generated by short-circuitry or opening of a switching element in the first bridge circuit is applied, and a second coil electromagnetically coupled to the first coil to transform the AC voltage applied to the first coil at a predetermined ratio; and a second bridge circuit including a plurality of switching elements to rectify an output voltage of the second coil or to convert an input DC voltage into an AC voltage and apply the converted AC voltage to the second coil.

According to other form, the first bridge circuit may include: a first input terminal and a second input terminal, between which a voltage of the AC charging power is applied; a first switching element and a second switching element, each having a first terminal respectively connected to the first input terminal; a third switching element connected to a second terminal of the first switching element; and a fourth switching element connected between a second terminal of the second switching element and a first terminal of the third switching element, wherein both ends of the first coil of the transformer may be connected to the second input terminal and a connection node of the third switching element and the fourth switching element, respectively.

According to one form, the second bridge circuit may include: a fifth switching element, a sixth switching element having a first terminal connected to a first terminal of the fifth switching element, a seventh switching element having a first terminal connected to a second terminal of the fifth switching element, and an eighth switching element connected between a second terminal of the sixth switching element and a second terminal of the seventh switching element, the second coil of the transformer is connected to a connection node of the fifth switching element and the sixth switching element and a connection node of the seventh switching element and the eighth switching element, and a voltage applied between a connection node of the fifth switching element and the seventh switching element and a connection node of the sixth switching element and the eighth switching element is an output voltage of the AC-DC conversion circuit.

According to one form, the electric power conversion system may further include a DC capacitor connected to an output terminal of the second bridge circuit.

According to another form, the electric power conversion system may further include a DC capacitor having both ends connected to the connection node of the fifth switching element and the seventh switching element and the connection node of the sixth switching element and the eighth switching element, respectively.

According to one form, in a charging mode in which the battery is charged with the AC charging power, the controller may control an output voltage of the AC-DC conversion circuit to be applied to the neutral point by short-circuiting the first switching device and controls the plurality of switching elements so that a circuit comprised of the plurality of switching elements in the inverter and the coils operates as a boosting converter.

According to another form, the controller may control a duty of a switching element connected to the negative terminal, among the plurality of switching elements in the inverter, to boost the charging voltage applied to the DC connection terminal so that the boosted voltage is applied to the battery.

According to other form, the transformer may further include: a third coil electromagnetically connected to the first coil or the second coil to output a voltage of the first coil or the second coil by transforming the voltage at a predetermined ratio; and a low voltage converter controlled by the controller to convert a voltage output from the third coil into a predetermined voltage lower than a voltage of the battery.

According to one form, the low voltage converter may include: a rectifier rectifying the voltage output from the third coil; a smoother smoothing the voltage rectified by the rectifier; and a voltage converter converting the smoothed voltage to the predetermined voltage.

According to another form, the rectifier may include a first diode having a cathode connected to a first end of the third coil and a second diode having a cathode connected to a second end of the third coil. The smoother may include: a capacitor having a first end connected to a middle point of the third coil, and a smoothing switching element having a first end connected to a second end of the capacitor and a second end connected in common to anodes of the first diode and the second diode. The voltage converter may be a buck converter including a buck switching element having a first end connected to a second end of the capacitor of the smoother, a third diode having a cathode connected to a second end of the buck switching element and an anode connected to the second end of the smoothing switching element, and an inductor having one end connected to the cathode of the third diode.

According to one form, the electric power conversion system may further include a second switching device connected between the positive terminal of the inverter and an output terminal of the AC-DC conversion circuit.

According to another form, the second switching device may be an active switch, short-circuitry or opening of which is determined by the controller, or a diode having an anode connected to the positive terminal of the inverter and a cathode connected to the output terminal of the AC-DC conversion circuit.

According to other form, in a charging mode in which the battery is charged with the AC charging power, the controller may open the second switching device, cause an output voltage of the AC-DC conversion circuit to be applied to the neutral point by short-circuiting the first switching device, control the plurality of switching elements in the inverter so that a circuit formed by the plurality of switching elements and the plurality of coils operates as a boosting inverter, and control the low voltage converter to convert the voltage, output from the third coil by electrical coupling between the first coil and the third coil, into the predetermined voltage lower than the voltage of the battery.

According to one form, in a travel mode in which the motor is actuated, the controller may open the first switching device, cause the voltage of the battery to be applied to the second bridge circuit by short-circuiting the second switching device, convert the voltage of the battery by controlling states of the switching elements in the second bridge circuit so that an AC voltage is applied to the second coil, control the plurality of switching elements in the inverter so that a circuit formed by the plurality of switching elements and the plurality of coils operates as a boosting inverter, and control the low voltage converter to convert the voltage, transformed and output from the third coil by electrical coupling between the second coil and the third coil, into the predetermined voltage lower than the voltage of the battery.

According to another form, the controller may open the switching elements in the first bridge circuit in the travel mode in which the motor is actuated.

According to another aspect of the present disclosure, provided is a control method of the above-described electric power conversion system for a vehicle. The method may include: determining, by the controller, whether the vehicle is in a charging mode in which the battery is charged with the AC charging power or in a travel mode in which the motor is actuated; when the vehicle is determined to be in the charging mode, short-circuiting the first switching device, opening the second switching device, causing the output voltage of the AC-DC circuit to be applied to the neutral point, and controlling the plurality of switching elements in the inverter so that a circuit formed by the plurality of switching elements in the inverter and the plurality of coils operates as a boosting converter; controlling the low voltage converter to convert the voltage, output from the third coil by electrical coupling between the first coil and the third coil, into the predetermined voltage lower than the voltage of the battery; and when the vehicle is determined to be in the travel mode, opening the first switching device, causing the voltage of the battery to be applied to the second bridge circuit by short-circuiting the second switching device, converting the voltage of the battery by controlling states of the switching elements in the second bridge circuit so that an AC voltage is applied to the second coil, controlling the plurality of switching elements in the inverter so that a circuit formed by the plurality of switching elements and the coils operates as a boosting inverter, and controlling the low voltage converter to convert the voltage, transformed and output from the third coil by electrical coupling between the second coil and the third coil, into the predetermined voltage lower than the voltage of the battery.

In the electric power conversion system for a vehicle and the control method thereof according to the plurality of forms of the present disclosure, a plurality of components provided in an on-board charger, such as a power factor correction circuit or an insulating converter, can be omitted, differently from a vehicle power conversion system of the related art. The second-side bridge circuit of the AC-DC converter may be shared by the first side of the low voltage converter to reduce the number of components and reduce the size and weight of the system. Accordingly, the power conversion system in the vehicle can be easily packaged, and the mass production thereof can be facilitated, due to the reduced fabrication costs and the reduced number of components.

The objective of the present disclosure is not limited to the aforementioned description, and other objects not explicitly disclosed herein will be clearly understood by those skilled in the art to which the present disclosure pertains from the description provided hereinafter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an electric power conversion system and a control method thereof according to a variety of foams will be described in detail with reference to the accompanying drawings.

Figure 1:
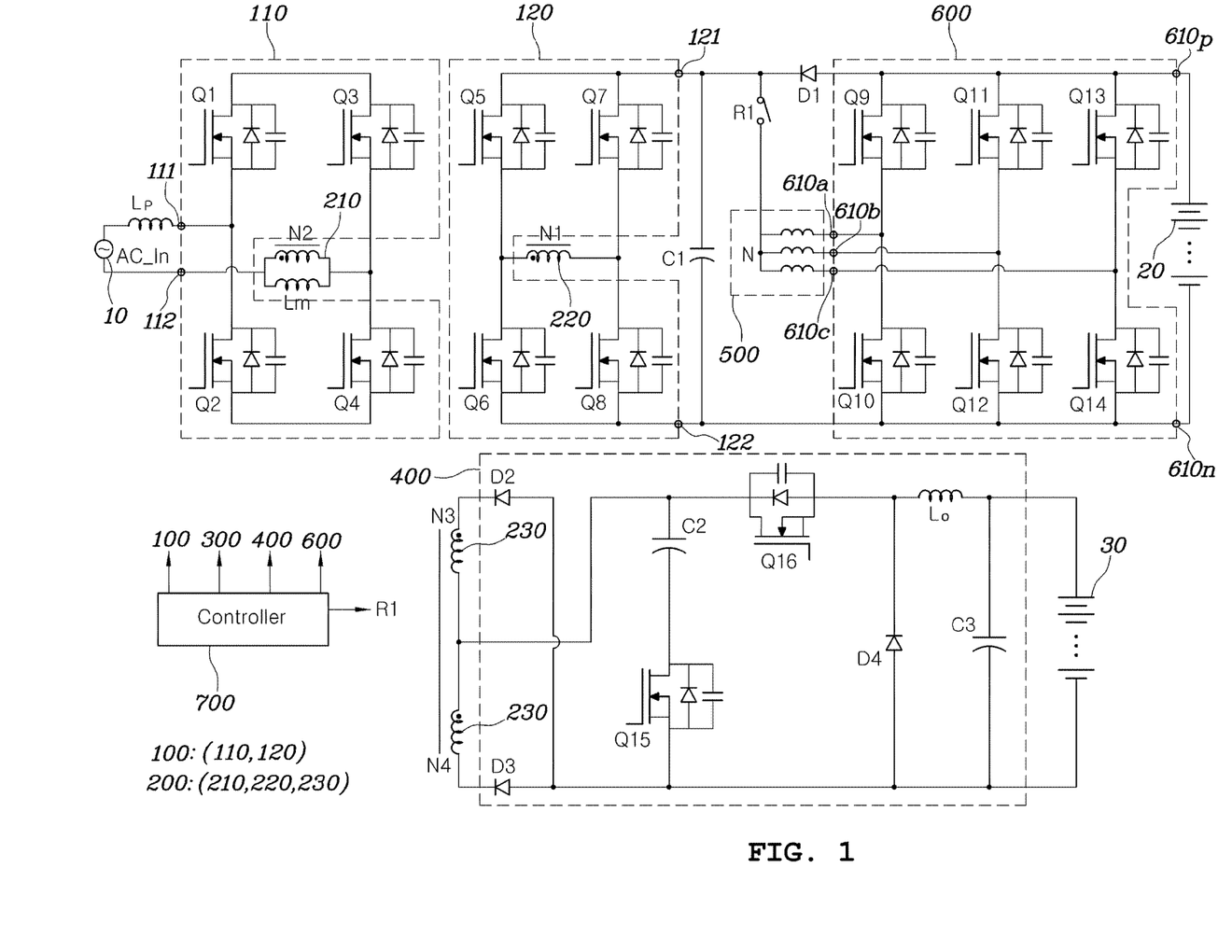
FIG. 1 is a circuit diagram illustrating a power conversion system for a vehicle.

FIG. 1 is a circuit diagram illustrating an electric power conversion system for a vehicle according to one form of the present disclosure.

Referring to FIG. 1, the electric power conversion system for a vehicle includes: an AC-DC conversion circuit 100, a motor 500, a first switching device R1, an inverter 600, a battery 20, and a controller 700. The AC-DC conversion circuit 100 converts AC charging power AC_In into DC power. The motor 500 includes a plurality of coils, one end of each being connected to a single point, i.e. a neutral point N. The first switching device R1 selectively allows or blocks the supply of output power from the AC-DC conversion circuit to the neutral point N. The inverter 600 includes a plurality of motor connection terminals 610a, 610b, and 610c connected to the other ends of the coils of the motor 500, respectively, DC connection terminals 610p and 610n including a positive terminal 610p and a negative terminal 610n, and a plurality of switching elements foaming electrical connections between the DC connection terminals 610p and 610n and the plurality of motor connection terminals 610a, 610b, and 610c. The battery 20 is connected to the DC connection terminals 610p and 610n of the inverter 600. The controller 700 controls the operation of the AC-DC conversion circuit 100, the first switching device R1, and the inverter 600, in accordance with whether or not the battery 20 is charged.

In addition, the electric power conversion system for a vehicle according to the form of the present disclosure may further include a DC capacitor C1 forming a DC voltage in a DC output side of the AC-DC conversion circuit 100, a second switching device D1 determining an electrical connection state between the positive terminal 610p of the inverter 600 and the AC-DC conversion circuit 100, and a low voltage converter 400.

The electric power conversion system for a vehicle is a system able to convert an AC charging voltage, input from an external source, into a DC voltage using the AC-DC conversion circuit 100 and then charge the battery 20 by using a motor actuation system comprised of the motor 500 and the inverter 600 as a power conversion circuit, with a structure comprised of a power factor correction circuit and a DC-DC converter, disposed in a vehicle on-board charger of the related art, being removed therefrom.

In addition, the electric power conversion system is a system in which a second bridge circuit 120 of the AC-DC conversion circuit 100 can substitute a first side of a low voltage converter of the related art separately provided with first and second bridge circuits to convert a voltage of the high voltage battery 20 for actuating a motor into a low voltage for driving electrical components of the vehicle.

As described above, in the electric power conversion system for a vehicle according to the form of the present disclosure, a plurality of components can be omitted or shared, compared to the vehicle power conversion system of the related art, thereby reducing the number of components and reducing the size and weight of the system.

The AC-DC conversion circuit 100 converts an AC voltage, supplied from external AC charging equipment 10, into a DC voltage using a plurality of switching elements and a transformer while providing electrical insulation between the battery 20 in the vehicle and the AC charging equipment 10, i.e. input and output terminals of the AC-DC conversion circuit 100.

The AC-DC conversion circuit 100 includes a first bridge circuit 110, a transformer 200, and the second bridge circuit 120. The first bridge circuit 110 includes a plurality of switching elements forming a bridge circuit, to which AC charging power is applied from the external AC charging equipment 10. The transformer 200 includes a first coil 210, to which an AC voltage generated by short-circuitry or opening of a switching element in the first bridge circuit 110 is applied, and a second coil N2 electromagnetically coupled to the first coil 210 to convert the AC voltage applied to the first coil 210 at a predetermined ratio. The second bridge circuit 120 includes a plurality of switching elements to rectify an output voltage of the second coil N2 or to convert an input DC voltage into an AC voltage and apply the converted AC voltage to the second coil N2.

More specifically, the first bridge circuit 110 may include a first input terminal 111 and a second input terminal 112, between which a voltage of the AC charging power is applied, a first switching element Q1 and a second switching element Q2, one terminal of each being connected to the first input terminal 111, a third switching element Q3 connected to the other terminal of the first switching element Q1, and a fourth switching element Q4 connected between the other terminal of the second switching element Q2 and the other terminal of the third switching element Q3. Both ends of the first coil 210 of the transformer 200 may be connected to the second input terminal 112 and to a connection node of the third switching element Q3 and the fourth switching element Q4, respectively.

The second bridge circuit 120 may include a fifth switching element Q5, a sixth switching element Q6 having one terminal connected to one terminal of the fifth switching element Q5, a seventh switching element Q7 having one terminal connected to the other terminal of the fifth switching element Q5, and an eighth switching element Q8 connected between the other terminal of the sixth switching element Q6 and the other terminal of the seventh switching element Q7. Both ends of the second coil 220 of the transformer 200 may be connected to a connection node of the fifth switching element Q5 and the sixth switching element Q6 and a connection node of the seventh switching element Q7 and the eighth switching element Q8, respectively. In addition, a voltage applied between a connection node 121 of the fifth switching element Q5 and the seventh switching element Q7 and a connection node 122 of the sixth switching element Q6 and the eighth switching element Q8 may be an output voltage of the AC-DC conversion circuit. Thus, both ends of a DC capacitor C1 for forming a DC voltage may be connected to the connection node 121 of the fifth switching element Q5 and the seventh switching element Q7 and the connection node 122 of the sixth switching element Q6 and the eighth switching element Q8, respectively.

In a vehicle travel mode as will be described later, the connection node 121 of the fifth switching element Q5 and the seventh switching element Q7 and the connection node 122 of the sixth switching element Q6 and the eighth switching element Q8 may be input terminals receiving an input voltage from the battery 20.

The motor 500 is an electric rotating machine generating torque in response drive power being supplied thereto from the battery via the inverter 600. The motor 500 may generally operate by receiving AC power corresponding to a plurality of phases from the inverter 600. In the vehicle travel mode in which torque is generated by actuating the motor 500, the inverter 600 provides different phases of AC power to phases of the motor 500, respectively, by performing pulse-width modulation (PWM) on the switching elements Q9 to Q14 therein. In general, as illustrated in FIG. 1, the motor 500 may be expressed as a structure comprised of a plurality of coils corresponding to a plurality of phases, respectively. One end of each of the coils corresponding to the phases is electrically connected to each other, such that a Y-phase open structure may be provided. Here, a point at which the coils corresponding to the phases in the motor 500 are connected to each other is referred to as the neutral point N.

According to one form of the present disclosure, in a charging mode in which charging power received from an external source is provided to the battery 20 after having been converted, the DC output voltage of the AC-DC conversion circuit 100 may be applied to the neutral point N of the motor 500. Since the neutral point N of the motor 500 must be disconnected from the other power converting components in the travel mode in which the motor 500 is actuated, the first switching device R1 able to selectively allow or block the supply of output power from the AC-DC conversion circuit to the neutral point N may be provided.

The state (short-circuitry or opening) of the first switching device R1 may be controlled by the controller 700. The first switching device R1 may be implemented as a variety of switching components, such as a relay or semiconductor switch, the state of which can be controlled by an external control signal.

The inverter 600 has the DC connection terminals including the positive terminal 610p and the negative terminal 610n connected to both terminals of the battery 20, respectively, and three legs connected between the DC connection terminals to be parallel to each other. Two switching elements (i.e. two switching elements among the switching elements Q9 to Q14 are connected to each of the legs in series. Connection nodes of the switching elements connected to the legs in series are the plurality of motor connection terminals 610a, 610b, and 610c connected to the phases of the motor 500, respectively.

In general, in traveling of the vehicle, the inverter 600 may convert DC power, stored in the battery 20, into a plurality of phases of AC current and provide the plurality of phases of AC current to the phases of the motor 500, respectively.

As described above, the connection nodes of the switching element Q9 and Q10, the switching elements Q11 and Q12, and the switching elements Q13 and Q14, included in the legs of the motor, may be connected to the coils corresponding to the phases of the motor 500 via the motor connection terminals 610a, 610b, and 610c. Regarding this connection structure in terms of the circuit, two switching elements included in each of the legs of the inverter 600 and a single coil among the coils in the motor 500, with one end of the single coil being connected to the connection node of the two switching elements, may form the topology of a boosting DC-DC converter.

When a flow of energy is directed from the neutral point N of the motor 500 to the DC connection terminals 610p and 610n of the inverter 600, the circuit structure including the switching elements of the inverter 600 and the coil of the motor 500 may form a boosting DC-DC converter to control duties of the switching elements Q10, Q12, and Q14 of the bottom phase connected to the negative terminal 610n. Since the three-phase inverter 600 has a total of three legs, a structure in which three boosting DC-DC converters are connected in parallel between the DC connection terminals 610p and 610n of the inverter 600 and the neutral point N of the motor 500 is provided.

In the charging mode in which the battery 20 is charged, the controller 700 may boost a voltage output from the AC-DC conversion circuit 100 by controlling the duties of the switching elements Q10, Q12, and Q14 of the bottom phase connected to the negative terminal 610n in the circuit structure including the switching elements of the inverter 600 and the coils of the motor 500 before supplying the voltage to the battery 20.

The transformer 200 may further include a third coil 230 forming an electromagnetic coupling with the first coil 210 or the second coil 220. The third coil 230 may be included in the low voltage converter 400. That is, the third coil 230 may output the voltage of the first coil 210 by inducing the voltage at a ratio of numbers of turns between the first and third coils 210 and 230 by the electromagnetic coupling with the first coil 210 or may output the voltage of the second coil 220 by inducing the voltage at a ratio of numbers of turns between the second and third coils 220 and 230 by the electromagnetic coupling with the second and third coils 220 and 230.

The low voltage converter 400 may output a voltage induced by the third coil 230 by converting the voltage to a suitable magnitude. The output voltage of the low voltage converter 400 may have a magnitude corresponding to the magnitude of power of electrical components of the vehicle. The output terminal of the low voltage converter 400 may be connected to the electrical components or may be connected to an auxiliary battery 30 having a voltage corresponding to the magnitude of a power voltage of electrical components of the vehicle. The auxiliary battery 30 may be charged using the output voltage of the low voltage converter 400.

The low voltage converter 400 may include a rectifier, a smoother, and a voltage converter.

The rectifier may include a first diode D2 having a cathode connected to one end of the third coil 230 and a second diode D3 having a cathode connected to the other end of the third coil 230.

The smoother may include a capacitor C2 having one end connected to a middle point of the third coil 230 and a smoothing switching element Q15 having one end connected to the other end of the capacitor C2 and the other end connected in common to anodes of the first diode D2 and the second diode D3.

The voltage converter may be implemented as a buck converter including a buck switching element Q16 having one end connected to the other end of the capacitor C2 of the smoother, a third diode D4 having a cathode connected to the other end of the buck switching element Q16 and an anode connected to the other end of the smoothing switching element Q15, and an inductor Lo having one end connected to the cathode of the third diode D4.

According to one form of the present disclosure, in the travel mode of the vehicle, the second bridge circuit 120 in the AC-DC conversion circuit 100 may convert the DC voltage of the battery 20 into an AC voltage to apply the AC voltage to the second coil 220 of the transformer 200, and may cause a voltage to be output to the third coil 230 by electromagnetic induction between the second coil 220 and the third coil 230, so that the low voltage converter 400 may charge the auxiliary battery 30 or provide a power voltage to the electrical components. In addition, in the charging mode, the output voltage of the second bridge circuit 120 must be boosted by the boosting converter comprised of the coil of the motor 500 and the inverter 600 before being applied to the battery 20, instead of being directly applied to the battery 20.

In this regard, the second switching device D1 able to determine an electrical connection state between the battery 20 and the second bridge circuit 120 is desired to be present between the battery 20 and the second bridge circuit 120.

In the foam illustrated in FIG. 1, the switching device D1, provided between the battery 20 and the second bridge circuit 120, may be implemented as a diode D1 having an anode connected to the battery 20 and a cathode connected to the second bridge circuit 120. More specifically, the anode of the diode D1 may be connected to the positive terminal 610p of the DC connection terminal of the inverter 600, while the cathode of the diode D1 may be connected to the output terminal of the second bridge circuit 12, i.e. the connection node 121 of the fifth switching element Q5 and the seventh switching element Q7.

Figure 2:
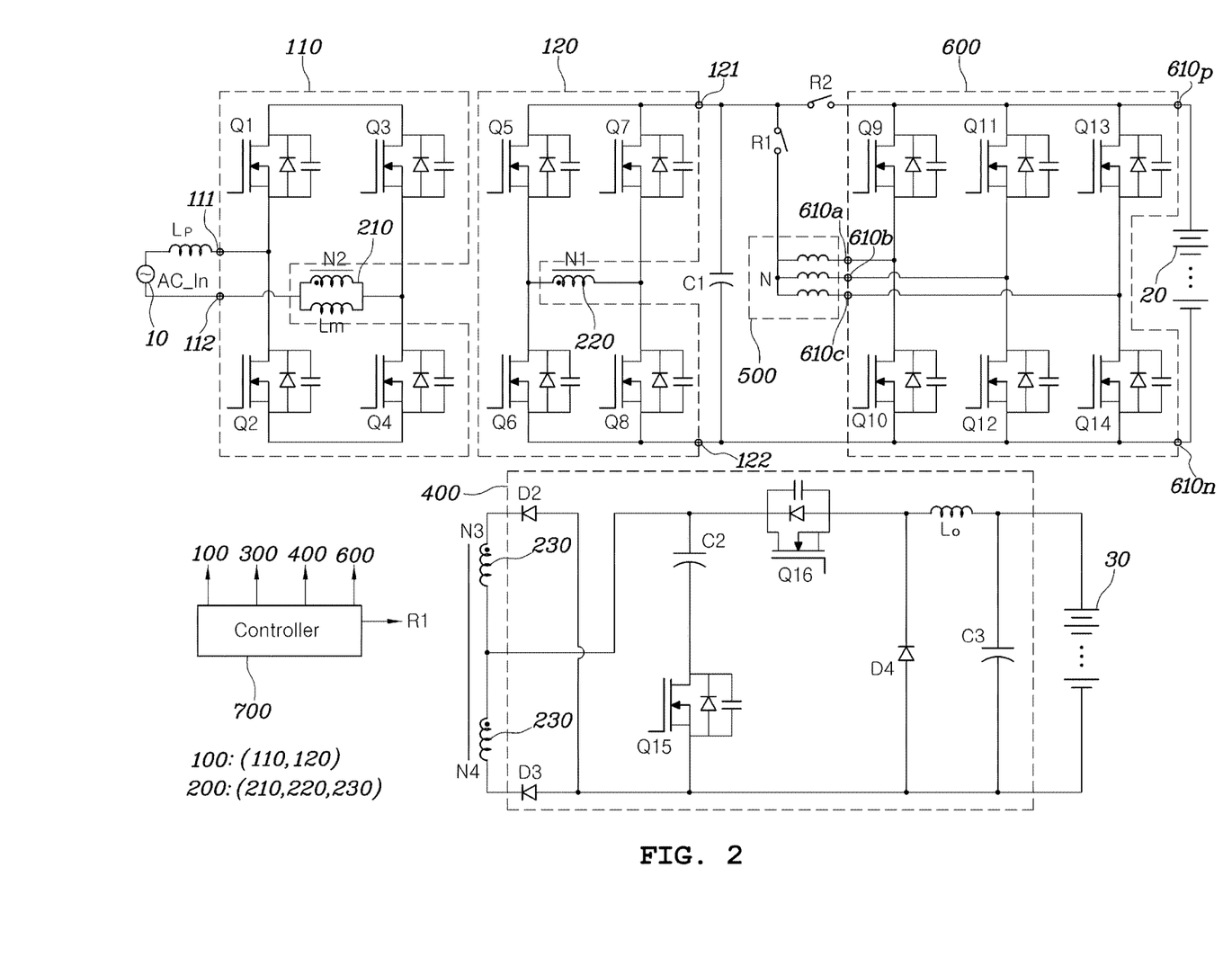
FIG. 2 is a circuit diagram illustrating a power conversion system for a vehicle.

FIG. 2 is a circuit diagram illustrating a power conversion system according to another form of the present disclosure.

In the form illustrated in FIG. 2, an active switch R2 may be applied as a switching device between the battery 20 and the second bridge circuit 120. Both ends of the active switch R2 are connected to the positive terminal of the battery 20 and the second bridge circuit 120, such that opening or short-circuitry of the active switch R2 may be controlled by the controller 700. The active switch R2 may be implemented as a device known in the art, such as a relay or a semiconductor switch, the short-circuitry or opening of which can be controlled by an external control signal.

The controller 700 may suitably control the above-described components to convert AC charging power, supplied from an external source, into DC power to charge the battery 20 or suitably convert the magnitude of a voltage of the battery 20 to be applied to the auxiliary battery 30 or the electrical component, in accordance with the state of the vehicle, i.e. whether the vehicle is in the travel mode or the charging mode.

In FIGS. 1 and 2, reference numeral "C3" is an output capacitor for forming a DC voltage output to the auxiliary battery 30.

Specific operations and functions of the electric power conversion system for a vehicle having the above-described configuration according to forms of the present disclosure will be more clearly understood from the following description of a control method of the electric power conversion system for a vehicle.

Figure 3:
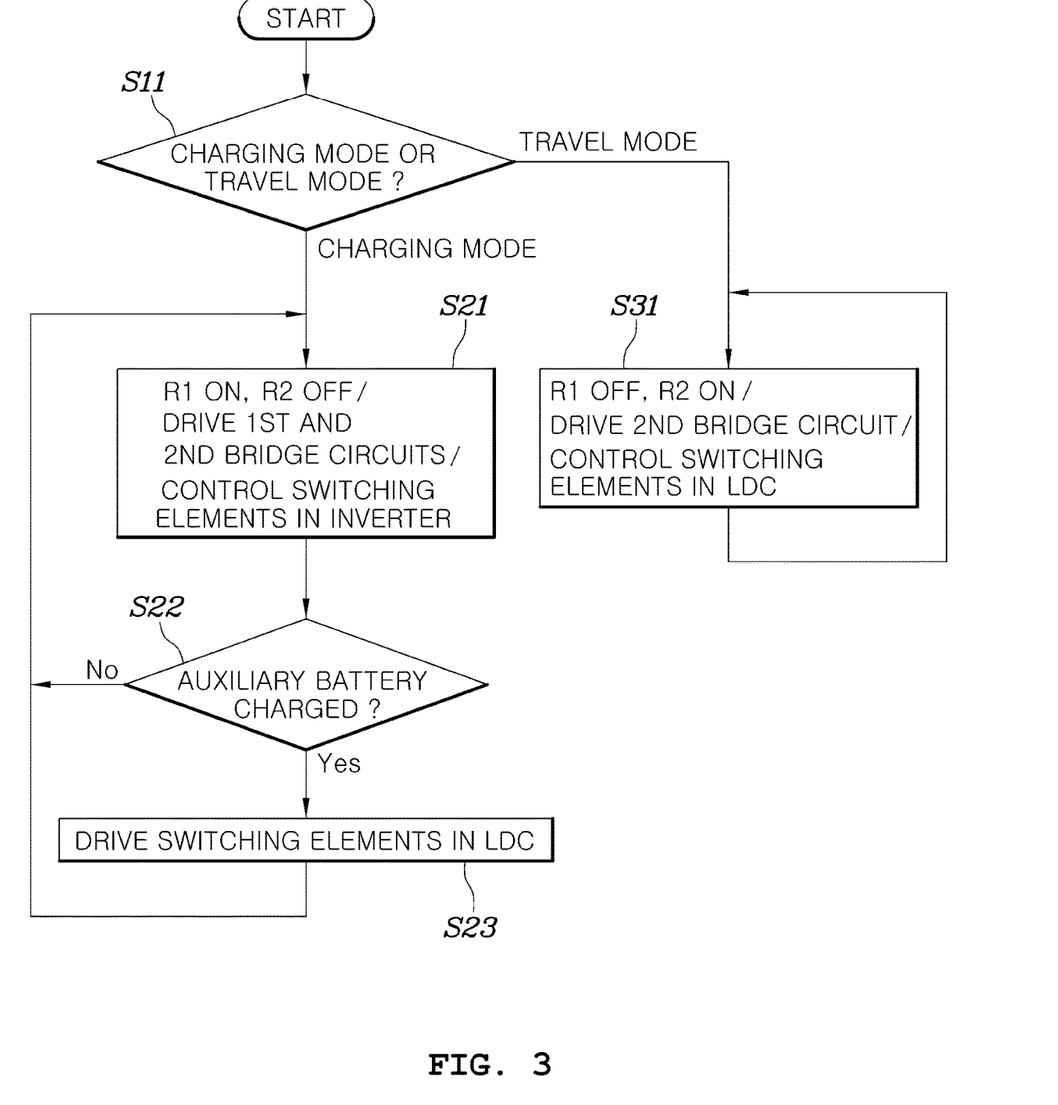
FIG. 3 is a flowchart illustrating a control method of a power conversion system for a vehicle.

FIG. 3 is a flowchart illustrating a control method of a power conversion system according to another form of the present disclosure.

Referring to FIG. 3, the control method of the electric power conversion system for a vehicle may start with step S11 in which the controller 700 determines an operation mode of the vehicle.

In step S11, the controller 700 may determine whether the vehicle is in the travel mode to be propelled by the actuation of the motor 500 or in the charging mode in which the battery 20 is charged with charging power provided from the external charging equipment 10 by referring to an input signal regarding a vehicle travel mode provided from a higher-level controller, a connection of the external charging equipment 10, a variety of input signals in response to the manipulation of the driver, or the like.

When the vehicle is determined to be in the charging mode in the step S11, the controller 700 may perform a control operation of converting AC charging power, provided from the external charging equipment 10, into DC power and providing the DC power to the battery 20.

In the step S21, the controller 700 causes the switching device R1 to be short-circuited and controls the state of the switching elements Q1 to Q4 of the first bridge circuit 110 so that an AC voltage is applied to the first coil 210 of the transformer 200. Accordingly, an AC voltage at the ratio of numbers of turns of the first coil 210 and the second coil 220 may be induced to the second coil 220 by the electromagnetic coupling between the first coil 210 and the second coil 220, and the controller 700 may rectify the output AC voltage induced by the second coil 220 by controlling the switching elements Q5 to Q8 of the second bridge circuit 120. The capacitor C1 connected to the output terminal of the second bridge circuit 120 may smooth the voltage output from the second bridge circuit 120, thereby forming a DC voltage.

In addition, in the step S21, the controller 700 may boost the voltage, applied to the neutral point of the motor 500 via the switching device R1, by controlling the switching elements Q9 to Q14 in the inverter 600, and output the boosted voltage to the battery 20. Here, the diode D1 illustrated in FIG. 1 can block direct application of the output voltage of the AC-DC conversion circuit 100 to the battery 20, due to the cathode thereof being connected to the output terminal of the second bridge circuit 120. In addition, in an example in which the active switch R2 is provided between the AC-DC conversion circuit 100 and the battery 20, the controller 700 can block direct application of the output voltage of the AC-DC conversion circuit 100 to the battery 20 by opening the active switch R2.

In the charging mode, when the controller 700 determines charging is desired since the voltage of the auxiliary battery 30 is lower than a predetermined reference value or the state of charge of the auxiliary battery 30 is lower than a predetermined reference value in step S22, the controller 700 can operate the low voltage converter 400 so that the voltage is applied to the auxiliary battery 30 in step S23.

In the step S23, an AC voltage at the ratio of numbers of turns between the first coil 210 and the third coil 230 can be applied to the third coil 230 by electromagnetic induction between the first coil 210 and the third coil 230 of the transformer 200, and the AC voltage induced to the third coil 230 can be rectified by the connection structure of the two diodes D2 and D3, be applied to the capacitor C2, and be smoothed by the capacitor C2. Here, the controller 700 can control the smoothing switching element Q15 to be short-circuited. In addition, the controller 700 can cause a voltage, the magnitude of which is suitable to charge the auxiliary battery 30, to be generated on the output terminal of the low voltage converter 400 by controlling the duty of the buck switching element Q16.

When the vehicle is determined to be in the travel mode in the step S11, the controller 700 opens the switching device R1 and opens all of the switching elements Q1 to Q4 in the first bridge circuit 110. Afterwards, the controller 700 may not perform an additional control operation. That is, in the travel mode, the controller 700 may not operate the first bridge circuit 110 in step S31.

In the step S31, the controller 700 can cause the voltage of the battery 20 to be provided to the auxiliary battery 30 by converting the magnitude of the voltage of the battery 20. In the example illustrated in FIG. 1, the voltage of the battery 20 may be provided to the second bridge circuit 120 by the diode D1. In the example illustrated in FIG. 2, the controller 700 may cause the active switch R2 to be short-circuited so that the voltage of the battery 20 is provided to the second bridge circuit 120.

In addition, in the step S31, the controller 700 may cause the AC voltage to be applied to the second coil 220 by controlling opening or short-circuitry of the switching elements Q5 to Q8 in the second bridge circuit 120. Accordingly, an AC voltage at the ratio of numbers of turns between the second coil 220 and the third coil 230 may be induced to the third coil 230 by electromagnetic induction between the second coil 220 and the third coil 230 of the transformer 200. The AC voltage induced to the third coil 230 may be rectified by the connection structure of the two diodes D2 and D3, be applied to the capacitor C2, and be smoothed by the capacitor C2. Here, the controller 700 may control the smoothing switching element Q15 to be short-circuited. In addition, the controller 700 may cause a voltage, the magnitude of which is suitable to charge the auxiliary battery 30, to be generated on the output terminal of the low voltage converter 400 by controlling the duty of the buck switching element Q16.

As described above, according to the plurality of forms of the present disclosure, in the charging mode of the vehicle, a flow of power may be directed in the order of the first bridge circuit 110, the second bridge circuit 120, the motor 500, and the inverter 600 to charge the battery 20. A flow of power may be directed from the first bridge circuit 110 to the low voltage converter 400, as desired, in order to charge the auxiliary battery 30. In addition, in the travel mode of the vehicle, the first bridge circuit 110 may stop the operation and cause a flow of power to be directed in the order of the battery 20, the second bridge circuit 120, and the low voltage converter 400, so that the auxiliary battery 30 is charged or a power voltage is applied to the electrical components of the vehicle.

As set forth above, in the electric power conversion system for a vehicle and the control method thereof according to the plurality of forms of the present disclosure, a plurality of components provided in an on-board charger, such as a power factor correction circuit or an insulating converter, can be omitted, differently from a vehicle power conversion system of the related art. The second-side bridge circuit of the AC-DC converter may be shared by the first side of the low voltage converter to reduce the number of components and reduce the size and weight of the system. Accordingly, the power conversion system in the vehicle can be easily packaged, and the mass production thereof can be facilitated, due to the reduced fabrication costs and the reduced number of components.

Although the specific forms of the present disclosure has been described for illustrative purposes, those skilled in the art will appreciate that various modifications, additions and substitutions are possible, without departing from the scope and spirit of the present disclosure.

What is claimed is:
1. An electric power conversion system for a vehicle, the electric power conversion system comprising:
an AC-DC conversion circuit configured to convert AC charging power into DC power;
a motor including a plurality of coils each having a first end respectively connected to a neutral point;
a first switching device configured to selectively allow or block supply of output power from the AC-DC conversion circuit to the neutral point;
an inverter including:
a plurality of motor connection terminals respectively connected to second ends of the plurality of coils of the motor,
DC connection terminals including a positive terminal and a negative terminal, and
a plurality of switching elements forming electrical connections between the DC connection terminals and the plurality of motor connection terminals;
a battery connected to the DC connection terminals of the inverter; and
a controller configured to control operations of the AC-DC conversion circuit, the first switching device, and the inverter based on whether or not the battery is charged,
wherein the AC-DC conversion circuit includes:
a first bridge circuit including a plurality of switching elements forming a bridge circuit and configured to receive AC charging power from an external AC charging equipment;
a transformer including:
a first coil, to which an AC voltage generated by short-circuitry or opening of a switching element in the first bridge circuit is applied, and
a second coil electromagnetically coupled to the first coil to transform the AC voltage applied to the first coil at a predetermined ratio; and
a second bridge circuit including a plurality of switching elements configured to:
rectify an output voltage of the second coil or convert an input DC voltage into an AC voltage, and
apply the converted AC voltage to the second coil,
wherein the first bridge circuit includes:
a first input terminal and a second input terminal, between which a voltage of the AC charging power is applied;

a first switching element and a second switching element, each having a first terminal respectively connected to the first input terminal;
a third switching element connected to a second terminal of the first switching element; and
a fourth switching element connected between a second terminal of the second switching element and a first terminal of the third switching element, and
wherein both ends of the first coil of the transformer is connected to the second input terminal and a connection node of the third switching element and the fourth switching element, respectively.

2. The electric power conversion system according to claim 1, wherein the second bridge circuit includes: a fifth switching element, a sixth switching element having a first terminal connected to a first terminal of the fifth switching element, a seventh switching element having a first terminal connected to a second terminal of the fifth switching element, and an eighth switching element connected between a second terminal of the sixth switching element and a second terminal of the seventh switching element,
the second coil of the transformer is connected to a connection node of the fifth switching element and the sixth switching element and a connection node of the seventh switching element and the eighth switching element, and
a voltage applied between a connection node of the fifth switching element and the seventh switching element and a connection node of the sixth switching element and the eighth switching element is an output voltage of the AC-DC conversion circuit.

3. The electric power conversion system according to claim 2, further comprising: a DC capacitor having both ends connected to the connection node of the fifth switching element and the seventh switching element and the connection node of the sixth switching element and the eighth switching element, respectively.

4. The electric power conversion system according to claim 1, further comprising: a DC capacitor connected to an output terminal of the second bridge circuit.

5. The electric power conversion system according to claim 1, wherein, in a charging mode in which the battery is charged with the AC charging power,
the controller is configured to:
control an output voltage of the AC-DC conversion circuit to be applied to the neutral point by short-circuiting the first switching device and
control the plurality of switching elements so that a circuit comprised of the plurality of switching elements in the inverter and the plurality of coils operate as a boosting converter.

6. The electric power conversion system according to claim 5, wherein the controller is configured to:
control a duty of a switching element connected to the negative terminal, among the plurality of switching elements in the inverter,
boost a charging voltage applied to the DC connection terminal so that the boosted voltage is applied to the battery.

7. An electric power conversion system for a vehicle, the electric power conversion system comprising:
an AC-DC conversion circuit configured to convert AC charging power into DC power;
a motor including a plurality of coils each having a first end respectively connected to a neutral point;
a first switching device configured to selectively allow or block supply of output power from the AC-DC conversion circuit to the neutral point;
an inverter including:
a plurality of motor connection terminals respectively connected to second ends of the plurality of coils of the motor,
DC connection terminals including a positive terminal and a negative terminal, and
a plurality of switching elements forming electrical connections between the DC connection terminals and the plurality of motor connection terminals;
a battery connected to the DC connection terminals of the inverter; and
a controller configured to control operations of the AC-DC conversion circuit, the first switching device, and the inverter based on whether or not the battery is charged,
wherein the AC-DC conversion circuit includes:
a first bridge circuit including a plurality of switching elements forming a bridge circuit and configured to receive AC charging power from an external AC charging equipment;
a transformer including:
a first coil, to which an AC voltage generated by short-circuitry or opening of a switching element in the first bridge circuit is applied, and
a second coil electromagnetically coupled to the first coil to transform the AC voltage applied to the first coil at a predetermined ratio; and
a second bridge circuit including a plurality of switching elements configured to:
rectify an output voltage of the second coil or convert an input DC voltage into an AC voltage, and
apply the converted AC voltage to the second coil,
wherein the transformer further includes:
a third coil electromagnetically connected to the first coil or the second coil to output a voltage of the first coil or the second coil by transforming the voltage at a predetermined ratio; and
a low voltage converter controlled by the controller to convert a voltage output from the third coil into a predetermined voltage lower than a voltage of the battery.

8. The electric power conversion system according to claim 7, wherein the low voltage converter includes:
a rectifier configured to rectify the voltage output from the third coil;
a smoother configured to smooth the voltage rectified by the rectifier; and
a voltage converter configured to convert the smoothed voltage to the predetermined voltage.

9. The electric power conversion system according to claim 8, wherein the rectifier includes a first diode having a cathode connected to a first end of the third coil and a second diode having a cathode connected to a second end of the third coil,
wherein the smoother includes:
a capacitor having a first end connected to a middle point of the third coil, and
a smoothing switching element having:
a first end connected to a second end of the capacitor, and
a second end connected in common to anodes of the first diode and the second diode, and
wherein the voltage converter comprises:

a buck converter including a buck switching element having a first end connected to the second end of the capacitor of the smoother, a third diode having a cathode connected to a second end of the buck switching element and an anode connected to the second end of the smoothing switching element, and an inductor having one end connected to the cathode of the third diode.

10. The electric power conversion system according to claim 7, further comprising: a second switching device connected between the positive terminal of the inverter and an output terminal of the AC-DC conversion circuit.

11. The electric power conversion system according to claim 10, wherein the second switching device comprises an active switch, short-circuitry or opening of which is determined by the controller, or a diode having an anode connected to the positive terminal of the inverter and a cathode connected to the output terminal of the AC-DC conversion circuit.

12. The electric power conversion system according to claim 10, wherein, in a charging mode in which the battery is charged with the AC charging power, the controller is configured to:

open the second switching device, cause an output voltage of the AC-DC conversion circuit to be applied to the neutral point by short-circuiting the first switching device, control the plurality of switching elements in the inverter so that a circuit formed by the plurality of switching elements and the plurality of coils operates as a boosting inverter, and control the low voltage converter to convert the voltage, output from the third coil by electrical coupling between the first coil and the third coil, into the predetermined voltage lower than the voltage of the battery.

13. The electric power conversion system according to claim 10, wherein, in a travel mode in which the motor is actuated, the controller is configured to:

open the first switching device, cause the voltage of the battery to be applied to the second bridge circuit by short-circuiting the second switching device, convert the voltage of the battery by controlling states of the switching elements in the second bridge circuit so that an AC voltage is applied to the second coil, control the plurality of switching elements in the inverter so that a circuit formed by the plurality of switching elements and the plurality of coils operates as a boosting inverter, and control the low voltage converter to convert the voltage, transformed and output from the third coil by electrical coupling between the second coil and the third coil, into the predetermined voltage lower than the voltage of the battery.

14. The electric power conversion system according to claim 13, wherein the controller is configured to open the switching elements in the first bridge circuit in the travel mode in which the motor is actuated.

15. A control method of an electric power conversion for a vehicle, the method comprising:

providing an electric power conversion system having an AC-DC circuit which includes: a first bridge circuit including a plurality of switching elements forming a bridge circuit and configured to receive AC charging power from an external AC charging equipment; a transformer including a first coil, to which an AC voltage generated by short-circuitry or opening of a switching element in the first bridge circuit is applied, and a second coil electromagnetically coupled to the first coil to transform the AC voltage applied to the first coil at a predetermined ratio; and a second bridge circuit including a plurality of switching elements configured to: rectify an output voltage of the second coil or convert an input DC voltage into an AC voltage, and apply the converted AC voltage to the second coil, wherein the first bridge circuit includes: a first input terminal and a second input terminal, between which a voltage of the AC charging power is applied; a first switching element and a second switching element, each having a first terminal respectively connected to the first input terminal; a third switching element connected to a second terminal of the first switching element; and a fourth switching element connected between a second terminal of the second switching element and a first terminal of the third switching element, and wherein both ends of the first coil of the transformer is connected to the second input terminal and a connection node of the third switching element and the fourth switching element, respectively;

determining, by a controller, whether the vehicle is in a charging mode in which a battery is charged with AC charging power or in a travel mode in which a motor is actuated;

when the vehicle is in the charging mode, short-circuiting a first switching device, opening a second switching device, by which causing an output voltage of the AC-DC circuit to be applied to a neutral point, and controlling a plurality of switching elements in an inverter so that a circuit formed by a plurality of switching elements in the inverter and a plurality of coils operates as a boosting converter;

controlling a low voltage converter to convert the voltage, output from a third coil by electrical coupling between the first coil and the third coil, into a predetermined voltage lower than a voltage of the battery; and when the vehicle is in the travel mode, opening the first switching device, causing the voltage of the battery to be applied to the second bridge circuit by short-circuiting the second switching device, converting the voltage of the battery by controlling states of the plurality of switching elements in the second bridge circuit so that the converted AC voltage is applied to the second coil, controlling the plurality of switching elements in the inverter so that the circuit formed by the plurality of switching elements and the plurality of coils operates as a boosting inverter, and controlling the low voltage converter to convert the voltage, transformed and output from the third coil by electrical coupling between the second coil and the third coil, into the predetermined voltage lower than the voltage of the battery.

* * * * *